(12) United States Patent
White

(10) Patent No.: US 6,826,692 B1
(45) Date of Patent: Nov. 30, 2004

(54) METHOD AND APPARATUS TO PERMIT AUTOMATED SERVER DETERMINATION FOR FOREIGN SYSTEM LOGIN

(75) Inventor: Clive John White, Workingham (GB)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/219,854

(22) Filed: Dec. 23, 1998

(51) Int. Cl.$^7$ ........................ G06F 11/30; G06F 15/173; G06F 15/16
(52) U.S. Cl. ........................ 713/201; 713/200; 713/202; 709/223; 709/224; 709/225; 709/226; 709/229; 709/208
(58) Field of Search ................................ 713/200, 201, 713/202; 709/223, 224, 225, 226, 229, 208

(56) References Cited

U.S. PATENT DOCUMENTS

| | | | |
|---|---|---|---|
| 5,241,594 A | * | 8/1993 | Kung .......................... 713/151 |
| 5,483,652 A | | 1/1996 | Sudama et al. |
| 5,548,724 A | | 8/1996 | Akizawa et al. |

(List continued on next page.)

FOREIGN PATENT DOCUMENTS

| | | | |
|---|---|---|---|
| EP | 0 573 248 A1 | 6/1993 | ............. G06F/1/00 |
| EP | 0 570 683 | 11/1993 | |
| JP | 04-116754 | 4/1992 | ........... G06F/15/00 |
| JP | 11-041252 | 2/1999 | ........... H04L/12/28 |

OTHER PUBLICATIONS

Dutcher, Oct. 20, 1997, Tacacs, Radius Secure Servers, PC Week, v14, n44, p. 151(2).*

(List continued on next page.)

Primary Examiner—Ayaz Sheikh
Assistant Examiner—Jenise Jackson
(74) Attorney, Agent, or Firm—Fish & Richardson P.C.

(57) ABSTRACT

A method and apparatus for providing automatic user access authentication of any user who is a member of a set of authorized users of a computer enterprise from any one of a plurality of geographically dispersed user workstations, onto one of a plurality of predetermined local security servers, through the use of a single logon. A person server resident on a local security server compares the user-provided identification information to entries contained in a local authentication database. If the person server finds a match, the user is granted access to the local security server. If the person server does not find a match, the user-provided authentication information is not valid for granting access to the local security server and the person server then searches a network database to determine whether the entered user name is known to the enterprise. If the person server finds a single user name matching the previously entered user name, it returns the name of the local security server associated with the computer enterprise whose local authentication database may have the information necessary for allowing proper authentication of the user. Upon receiving the name of the newly-identified server, the client then automatically retrieves the server's logical location from a service mapping file and then repeats the authentication request to the new local security server. If the person server finds more than one user with the entered user name or if the person server fails to find any user name matching the previously entered user name, then it returns a failed logon request to the client. The system provides the capability to operate across a number of network protocols through its use of a standard directory protocol, such as the X.500 standard.

66 Claims, 4 Drawing Sheets

U.S. PATENT DOCUMENTS

| | | | |
|---|---|---|---|
| 5,586,260 | A | 12/1996 | Hu |
| 5,592,611 | A | 1/1997 | Midgely et al. |
| 5,598,536 | A | 1/1997 | Slaughter, III et al. |
| 5,604,490 | A | 2/1997 | Blakley, III et al. ..... 340/825.31 |
| 5,642,515 | A | 6/1997 | Jones et al. |
| 5,655,077 | A | 8/1997 | Jones et al. |
| 5,678,041 | A | 10/1997 | Baker et al. ................ 395/609 |
| 5,682,478 | A | 10/1997 | Watson et al. ......... 395/200.12 |
| 5,684,950 | A | 11/1997 | Dare et al. ............. 395/187.01 |
| 5,684,957 | A | 11/1997 | Kondo et al. .......... 395/200.06 |
| 5,689,638 | A | 11/1997 | Sadovsky .............. 395/188.01 |
| 5,696,895 | A | 12/1997 | Hemphill et al. |
| 5,729,682 | A | 3/1998 | Marquis et al. |
| 5,742,759 | A | 4/1998 | Nessett et al. ......... 395/187.01 |
| 5,764,890 | A * | 6/1998 | Glasser et al. .............. 713/202 |
| 5,774,551 | A * | 6/1998 | Wu et al. .................... 713/155 |
| 5,818,936 | A * | 10/1998 | Mashayekhi ................ 713/167 |
| 5,944,824 | A * | 8/1999 | He ............................. 713/201 |
| 5,978,813 | A * | 11/1999 | Foltz et al. ................. 707/201 |
| 6,131,120 | A * | 10/2000 | Reid |
| 6,144,959 | A * | 11/2000 | Anderson et al. .............. 707/9 |
| 6,192,405 | B1 * | 2/2001 | Bunnell ...................... 709/225 |
| 6,530,024 | B1 * | 3/2003 | Proctor |

OTHER PUBLICATIONS

Dunham, Apr. 1997, Network Directories and NDS, LAN Magazine, v12, n4, p. 59(5).*

Hurwicz, Mar. 1995, Under Lock and Key, LAN Magazine, v10, n3, p. 116(6).*

Pompili, Jan. 2002, From Nos to Net, PC Magazine, v16, n2, pNE1(7).*

Plain, The Promise of LDAP, May 1997, Computer Shopper, v17, n5, p574.*

"Partial Containment Structure for Inegration of Distributed Computer Environment and Local Registries," IBM Technical Disclosure Bulletin, vol. 38, No. 9, Sep. 1995, pp. 535–538.

Korean Office Action dated Nov. 26, 2001.

E.D. Sykas et al., "Overview of the CCITT X.500 Recommendations Series," Nov. 9, 1991, vol. 14, pp. 545–556, and accompanying Abstract.

Stallings, William, "*Operating Systems: Internals and Design Principles*", Third Edition, Prentice–Hall, Cover Page, Inside Cover Page, Table of Contents, and pp. 472–475, 1998.

Canadian Intellectual Property Office, Office Action, 4 pages, Nov. 10, 2003.

Office Action from Japanese Patent Office and translation for Japanese Patent Application No. HE1 11 (1999)–368145, 18 pages, Aug. 13, 2003.

Sykas, E.D., Lyberopoulos, G.L., "*An Overview of the CCITT X.500 Recommendation Series,*" Computer Communications, vol. 14, No. 9, pp 545–556, Nov. 1991.

* cited by examiner

| LOCAL AUTHENTICATION DATABASE RECORD ||
|---|---|
| USERNAME | ALPHANUMERIC < 10 CHARACTERS |
| PASSWORD | ALPHANUMERIC < 10 CHARACTERS |
| USER ROLE | ALPHANUMERIC < 10 CHARACTERS |

*FIG. 3*

| SERVICE MAPPING FILE RECORD ||
|---|---|
| LOCAL SECURITY SERVER NAME | ALPHANUMERIC |
| #1 STANDBY SERVER NAME | ALPHANUMERIC |
| #1 STANDBY SERVER LOGICAL LOCATION | ALPHANUMERIC |
| #2 STANDBY SERVER NAME | ALPHANUMERIC |
| #2 STANDBY SERVER LOGICAL LOCATION | ALPHANUMERIC |
| SERVICE MAPPING FILE VERSION NUMBER | NUMERIC |

*FIG. 4*

| NETWORK DATABASE ENTRY RECORD ||
|---|---|
| LOGICAL SECURITY SERVER NAME | ALPHANUMERIC |
| LSS LOGICAL LOCATION | ALPHANUMERIC |
| #1 STANDBY SERVER NAME | ALPHANUMERIC |
| #1 STANDBY SERVER LOGICAL LOCATION | ALPHANUMERIC |
| #2 STANDBY SERVER NAME | ALPHANUMERIC |
| #2 STANDBY SERVER LOGICAL LOCATION | ALPHANUMERIC |
| AUTHORIZED USER #1 | ALPHANUMERIC |
| USER #1 PASSWORD | ALPHANUMERIC |
| AUTHORIZED USER #2 | ALPHANUMERIC |
| USER #2 PASSWORD | ALPHANUMERIC |

*FIG. 5*

METHOD AND APPARATUS TO PERMIT AUTOMATED SERVER DETERMINATION FOR FOREIGN SYSTEM LOGIN

TECHNICAL FIELD OF THE INVENTION

This invention relates to an apparatus and method for automating authorized user access to a geographically dispersed network from any one of a plurality of workstations.

BACKGROUND OF THE INVENTION

Today's business environment is driven by information, and achieving the most effective use of information technology (IT) is a critical component in any organization's success. But the evolution of IT and its extension into all aspects of corporate and personal life has created increasing challenges—both to IT professionals and end users.

Over the past decade, the standard model for IT systems has changed significantly. In place of the mainframe-based systems which were controlled from a single, central department, organizations are moving rapidly toward a distributed computing environment where applications and services may reside anywhere on the network on different vendors' hardware and operating systems. The principal reason for connecting computers to networks, and connecting networks to other networks, is to enable computers to work together efficiently, and to simplify sharing of resources.

Distributed computer systems often have a global extent and may include many thousands of workstations in diverse geographic locations. Such systems are particularly useful to business travelers who may desire to access their network from virtually anywhere in the world. For example, a business traveler at a remote site may want to retrieve the latest cost data, obtain the status of a pending order, place a new order or simply read e-mail. Unfortunately, many client-server networks installed today include a wide variety of independent network server resources that prevent, or at least complicate this task. "Independent" in this context means that the network resource has an independent, as opposed to a shared user database. In an independent network, users who are geographically remote from their home terminals who would like to log onto their home network server are forced to enter routing and authentication information such as a network server ID, user identification and password to access the local independent network resource in which their account is maintained. Forgetting passwords and accessing the wrong service or application are but two of the frustrations that users attempt to eliminate by choosing easily remembered passwords and even writing logon information down in readily accessible places. In doing so, however, they are undermining security. Computer savvy users familiar with network naming conventions can easily overcome the inconvenience of signing onto one's workstation from a remote location while the large majority of other network users must either postpone completing a task or possibly resort to other non-network means of obtaining the information.

Real and potentially costly risks to modern day computing environments—from malicious or careless employees, hackers, or even espionage are sometimes tolerated to maintain productivity and avoid raising administrative overhead with security measures that hamper legitimate users. Prior art network access services have been developed to address the problems created when users attempt to access distributed networks from remote locations. These services provide user access to remote network resources through the use of authentication data stored in local memory. For example, U.S. Pat. No. 5,483,652 to Sudama et al. discloses a method and related apparatus for permitting a client entity to request access to a service or resource without knowledge of any more than a common name for the service or resource. Unfortunately, that system characteristically envisions that a user will attempt to access remote network resources (e.g., printers, special computers, and unique files) from his/her workstation and does not provide a capability for the user to either log onto the network or access such resources from remote workstations.

U.S. Pat. No. 5,598,536 to Slaughter et al., on the other hand, discloses an apparatus and method for providing remote users with access to their local computer network via a remote access network server. In that system, a remote user enters a unique user ID string to gain access to a remote computer. Once the remote user is authenticated, that remote user is granted access to the local network. While the system disclosed in Slaughter et al. has overcome many of the inconveniences that existed prior to its conception, it still requires a user to utilize two different authentication strings, depending upon whether he/she is attempting to log onto their local network server from either a local or remotely located workstation.

U.S. Pat. No. 5,655,077 to Jones et al. discloses a method and system for authenticating access to heterogenous computing services from a plurality of user workstations while minimizing the number of user interactions. To gain access to the system in Jones et al., a user designates a primary logon provider to provide an initial user interface. The user enters identification information and the computer system executes a logon sequence which first invokes the identified primary logon provider. The system authenticates the collected identification information to provide the user access to the network computer services. If the system logon procedure is not successful, then a logon sequence displays an additional screen to collect additional logon information. The logon sequence then invokes the logon routines of other logon providers to enable them to authenticate already collected identification information without displaying additional user interfaces. While this system attempts to log a user onto a network with the least amount of user interaction, it does require a user to designate a primary logon provider and then enter up to two strings of user authentication information before granting the user access to the network.

Still another concept for reducing the need for user interaction upon system logon is disclosed in U.S. Pat. No. 5,689,638 to Sadovsky which discloses a method and system for providing access to independent network resources. At system logon, the logon data is stored in the memory of a client computer. When a server is accessed, server authentication data is stored in a cache. System logon data and authorization data can be later applied to access another independent resource without requiring further user interaction. However, this patent does not address the problem of authenticating a user from a remote workstation whose default server fails to have stored therein the necessary user information that will allow initial authentication. In other words, if the default server does not recognize the entered user name and password, access to the network is denied.

An additional problem confronting network users wishing to log onto a remotely located network server is the necessity of communicating across the Internet and interfacing with the multiple protocols that operate on the Internet (e.g., IPX, TCP/IP, NetBEUI, etc.) In the past, a user wishing to communicate across multiple boundaries could not easily do so because of language and communication barriers between the user and the various network entities. The user had to know, and adapt to the specific protocol of each data storage entity in order to communicate requests for information to the entity in cognizable form and to translate information once received. Existing devices are limited in that they simply provide the capability to utilize a single protocol to communicate across the network.

In the last few years, a number of efforts have been undertaken to develop a standard database protocol, that allows users to communicate across a number of different network protocols. One such standard protocol is the X.500 standard, which was developed by the International Telegraph and Telephone Consultative Committee (CCITT). It provides a standard protocol which reduces the communication barriers presented by the number of different protocols operating on the Internet, and it permits local directories maintained by different entities to communicate with one another. CITT, The Directory-Overview Concepts, Models, and Services, X.500 Series Recommendation, Document AP IX-47-E. X.500 allows users to find information such as telephone numbers, addresses and other details of individuals and organizations in a convenient structure. X.500 directories are also characterized by their ability to efficiently handle large volumes of highly distributed information.

SUMMARY OF THE INVENTION

The subject invention dramatically simplifies the procedures for signing onto a network through the use of a single sign on procedure. Once the user logs on via a logon procedure, such as embodied in the procedure identified as AUTOSECURE™ Single Sign On (SSO) described in the Features Guide for V5.1 entitled "Autosecure SSO," copyrighted by PLATINUM technology, inc., 1997, wherein a user enters a user name and password, the system does the rest by enabling transparent access to all authorized applications and services and providing a simple, integrated view of the computer network. The single sign on capability functions whether a service is resident on a local or a remote network server, and it lets users sign on anywhere—even when they're traveling to remote locations. Also, the present invention is not restricted to securing only a particular (homogenous) environment. It operates across heterogenous platforms, which means that it can be used to control systems from any vendor or mix of vendors. This makes it far more applicable to an enterprise environment which can include any number of different vendors' platforms—both now and in the future.

Accordingly, it is an object of the present invention to simplify the task of granting a user access to a heterogenous network by providing an apparatus and method that allows a user to log onto a computer network from any one of a plurality of geographically dispersed user workstations on the network, using the same user name and password.

It is another object of the present invention to achieve the above object, and also provide a network access apparatus and method that allows a user to log onto an intranet from any workstation on the enterprise through the use of a single user name, password and user role.

It is still another object of the present invention to achieve one or more of the above objects and also provide a network access apparatus and method that allows a user to transparently communicate across a network comprised of a plurality of network communication protocols.

It is yet another object of the present invention to achieve one or more of the above objects and also provide a network access apparatus and method that first transmits a logon request from a user workstation to a local security server that either grants the authentication request or identifies a second local security server on the network that may grant the authentication request.

It is a further object of the present invention to achieve one or more of the above objects and also provide a network access apparatus and method that evaluates a logon request by searching a local authentication database resident on a local security server to determine whether to grant a user access to the network via the local security server.

It is a still further object of the present invention to achieve one or more of the above objects and also provide a network access apparatus and method that encrypts passwords stored in a local authentication database.

It is yet a further object of the present invention to achieve one or more of the above objects and also provide a network access apparatus and method that accesses a network database resident in internal memory of a local security server to identify a second local security server on the network that may grant an authentication request, in the event the user is denied network access via the first local security server.

It is another object of the present invention to achieve one or more of the above objects and also provide a network access apparatus and method that communicates authentication requests from a first local security server directly to a second local security server in the event the first local security server is unable to grant network access.

It is still another object of the present invention to achieve one or more of the above objects and also provide a network access apparatus and method that automatically communicates authentication requests from a user workstation to at least one local security server without any user interaction.

It is another object of the present invention to achieve one or more of the above objects and also provide a network access apparatus and method that maintains an audit log of all failed attempts to access network resources.

It is still another object of the present invention to achieve one or more of the above objects and also provide a network access apparatus and method that monitors the number of failed attempts to access network resources and disables the network resource in the event the number of failed logon attempts exceeds a database number.

It is yet another object of the present invention to achieve one or more of the above objects and also provide a network access apparatus and method that provides a redundant local security server capability wherein one or more standby servers can be used in the event a primary local security server is unavailable for any reason.

It is a further object of the present invention to achieve one or more of the above objects and also provide a network access apparatus and method that allows a user to log onto the highest priority local security server available from any user workstation on the network, simply by entering a user name and password.

It is a further object of the present invention to achieve one or more of the above objects and also provide a network access apparatus and method that maintains a single, centralized X.500 database of authorized network users on each local security server.

It is still a further object of the subject invention to achieve one or more of the above objects and also provide a network access apparatus and method that maintains a map of connection information for each local security server operating on the enterprise.

It is yet a further object of the subject invention to achieve one or more of the above objects and also provide a network access apparatus and method that utilizes a service mapping file server to periodically provide each associated workstation with an updated map of connection information for each local security server operating on the enterprise.

It is another object of the subject invention to achieve one or more of the above objects and also provide a network access apparatus and method that maintains an updated map of connection information for each local security server by systematically polling the other local security servers on the enterprise.

It is still another object of the present invention to achieve one or more of the above objects and also provide a network access apparatus and method that allows a user logged onto the network to access an assortment of network services based on the user's role.

It is yet another object of the present invention to provide a network access apparatus and method that maintains a single X.500 database on each local security server comprised of the users with their associated passwords that are authorized access to each local security server.

These and other more specific objects and advantages of the subject invention are demonstrated in a distributed computing network that provides an adaptive capability to log a user located at one of a plurality of user workstations, onto one of a plurality of predetermined network servers, through the use of a single logon. In a preferred embodiment, a primarily local security server adapted to be connected to a user workstation, authenticates user identification information entered by a user at the workstation, or generates a failed logon signal in the event the user-provided authentication information is not valid for granting access to the local security server. A person server operating on the local security server then receives the failed logon signal from the local security server, identifies an alternate local security server ID in which the previously entered user name corresponds to a valid user, and transmits the alternate local security server ID back to the first local security server. When the first local security server receives the alternate local security server ID, it transmits the user identification information to the alternate local security server and the user is validated on the alternate local security server and logged onto the computer network.

BRIEF DESCRIPTION OF THE DRAWINGS

FIG. 3 is a diagram of the structure of a local authentication database record;

FIG. 4 a diagram of the structure of a typical service mapping file record;

FIG. 5 is a diagram of the structure of a typical network database record;

DETAILED DESCRIPTION OF THE PREFERRED EMBODIMENTS

In the following detailed description of the preferred embodiment, reference is made to the accompanying drawings which form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

In this specification, the term "server" refers to a software process or set of processes that support some functionality. A local security server is a security access control software process to which end-users must authenticate before they can gain access to applications and systems on the computer network.

Figure 1:
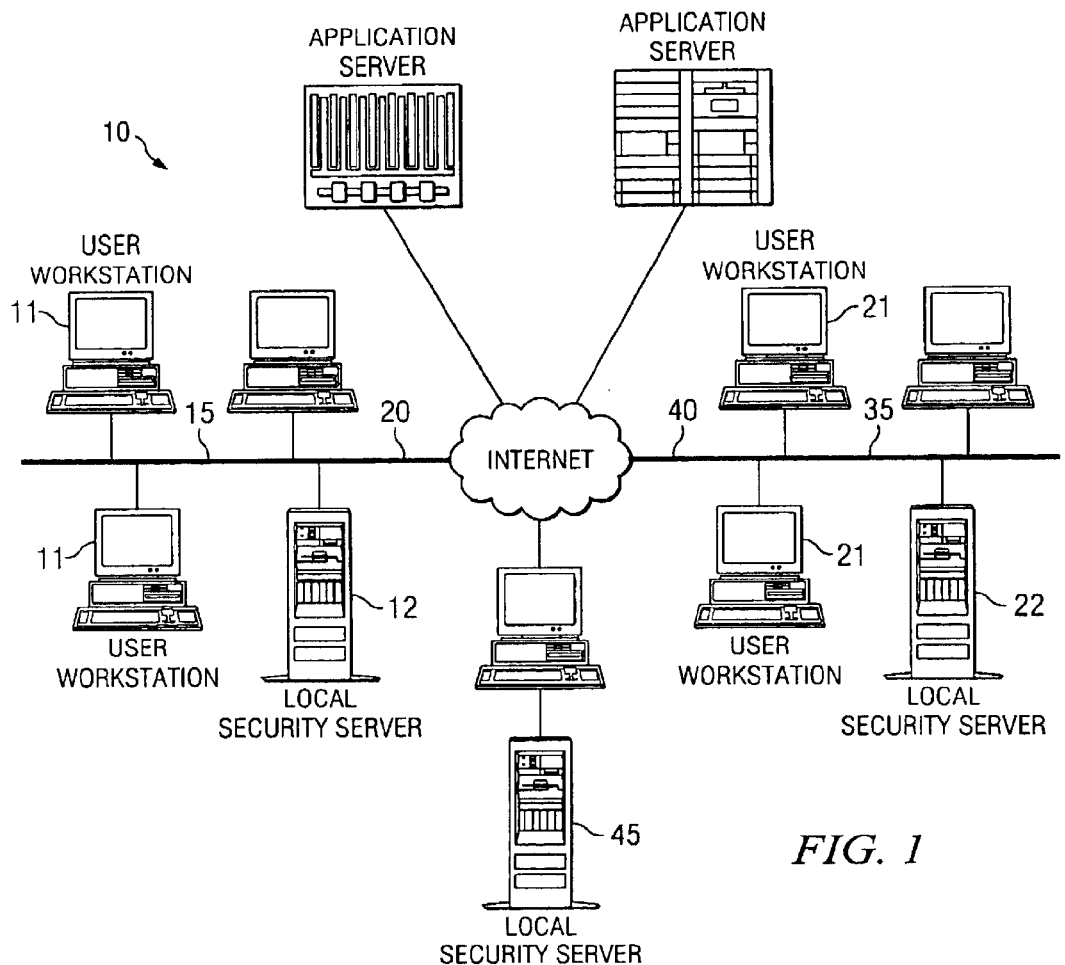
FIG. 1 is a block schematic diagram of a typical wide area computer network.

Referring to FIG. 1, in a computer network system or enterprise 10, computer workstations 11 and 21 are coupled to local security servers (LSSs) 12 and 22, respectively via communication links 15 and 35, respectively. While FIG. 1 depicts a singular user workstation coupled to each LSS, it should be apparent to those of ordinary skill in the art that any number of workstations could be coupled to each LSS. Each local security server (12 and 22) is configured to allow multi-user access to the server only upon user authentication to the server. Once a user is granted access to the network via an LSS (12 and 22), the LSS acts as a gateway to provide the user access to all network services the server is otherwise authorized to access. An LSS can be designated as a default, primary, and/or standby LSS, depending upon the context. More specifically, a default LSS is an LSS designated in client software by a system administrator to act as a particular workstation's principal server such that when anyone attempts to access the network using the user workstation, the system will automatically route the request to the workstation's default LSS. A primary server, on the other hand, is an LSS that has been designated by a system administrator to function as the server that a particular user will always be logged onto whenever the user attempts to access the network. A standby server correspondingly, is an LSS with the same user information as a primary server. A standby server can be used when a user's primary server is unavailable for any reason. Each primary server can have one or more standby servers. It should be obvious to one of ordinary skill in the art that an LSS can serve multiple purposes for multiple workstations. Referring again to FIG. 1, LSS 12 can act as a default LSS for user workstation 11 and a standby server for user workstation 21, as well as a primary LSS for a particular user. In essence, one LSS can be the default LSS for some user workstations, the standby LSS for other workstations as well as the primary LSS for some users.

Figure 2:
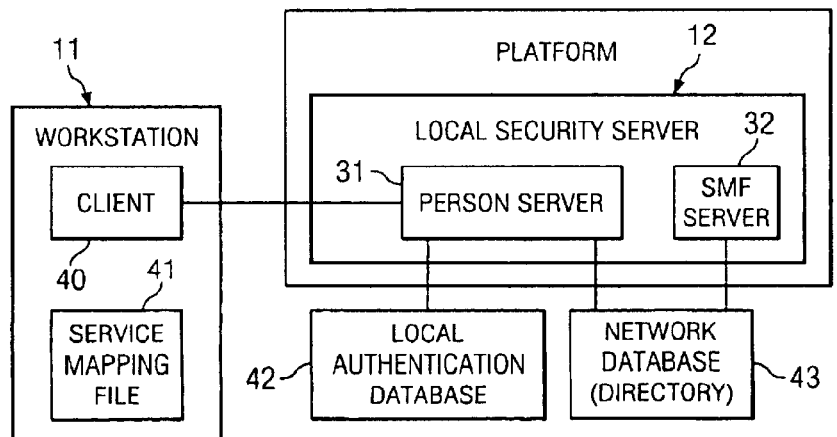
FIG. 2 is a block schematic diagram of a typical local computer network.

A client software process 40 (as shown in FIG. 2) operates on each computer workstation 11 and 21. When a user at a workstation wishes to gain access to the computer network, the client operating on the user workstation communicates the request for network access to a default LSS for authentication. The logical location and identity of a workstation's default LSS is a data value stored in the workstation's client. The default LSS may be the server located closest to the workstation or it may be another LSS operating elsewhere on the network. LSS 12 or LSS 22 in FIG. 1 could be the default server to workstation 11. LSS 22 or LSS 12 could also be the default server to workstation 21. It is important to note that the default LSS assigned to a workstation can be easily modified by a system administrator.

To add a new user to the network, a system administrator creates a new local authentication database record (FIG. 3) and copies the record into the internal memory of the LSS that is to become the new user's primary LSS. In the preferred embodiment, once a new record is copied into the primary LSS's local authentication database, the primary LSS will automatically route a copy of the new user record to all of the primary LSS's standby servers, as specified in the service mapping file (to be discussed later) which will result in the new user being automatically stored as a valid user in the standby server's memory. To enhance security, the entire record or at a minimum the user name and password can be encrypted prior to transmission to the standby server and then decrypted after receipt.

Also stored on each workstation is a service mapping file. As shown in FIG. 4, the service mapping file 41 contains a listing of all network LSSs with the name and logical location of their associated standby servers. The standby server is another LSS on the network with the same user information in its local authentication database as the default LSS. When a client attempts to access an LSS, if the LSS is not available its standby server will be invoked to process a logon request. A standby server is associated with a particular LSS through a network database entry. An example of one type of record which could be stored is described in FIG. 5. This network database entry may be entered into the system by a system administrator. Each record of the network database 43 is comprised of an LSS with its logical location and associated standby server names and logical locations together with the names of users authorized to log onto the LSS. In the preferred embodiment, the network database may be resident on disk storage of the LSS in the format of an X.500 or other suitable database.

Each LSS may be further coupled to the Internet or a similar computer network via communication links 20 and 40, respectively. As shown in FIG. 2, each LSS has access to a local authentication database 42 and a network database 43. These databases may be stored on either internal or external disk storage or any other suitable memory storage systems. A typical database record for the local authentication database 42 is depicted in FIG. 3. As shown in FIG. 3, each record at a minimum is comprised of a user name, password and user role. A user can have several local authentication database entries, each corresponding to a different role for the user. Examples of roles can include, but are not limited to "executive", "manager", "employee", etc. Roles can be related to, among other things, particular departments or positions within an organization. The user's role determines which network services can be accessed by the user. A network service may be an application program that has been properly installed on a server's internal disk memory. The services available and operable on each local security server are specified by a system administrator and installed on the server's disk storage when the local security is added to the network. Network services can be easily added, deleted or modified at any time by a system administrator. While this specification describes the invention with respect to a limited number of network services, it should be apparent to those of ordinary skill in the art that the number of network services is virtually unlimited. In the preferred embodiment, the local authentication database 42 is resident on disk storage of the LSS in the format of an X.500 or other suitable database. As is known by those of ordinary skill in the art, the X.500 database may also be resident in an external storage area.

As seen in FIG. 2, each LSS is comprised of a person server 31 and a service mapping file (SMF) server. The person server 31 is a software process operating on the LSS that receives all requests to log onto the network from a client 40, processes the requests and returns the results of a logon request back to the client 40. The person server 31 utilizes the user name/password combination received from the client to index into the local authentication database 42 stored in the server's disk storage. If the corresponding user name/password is stored in the local authentication database 42, the user will be connected to the local server. If the username/password combination is not found in the local authentication database, then the person server 31 searches the network database 43 (directory) to determine whether the user name exists on the enterprise. If the user name is found in the network database, the user authentication request is routed to the identified LSS for processing of the request. If, on the other hand, the user name is not found in the network database, the system will either deny the user's request or it may query the user to provide more information in order to process the authentication request.

The SMF server stores the service mapping file 41 on each LSS. As previously stated, the service mapping file 41 contains operational details of all servers on the enterprise. The SMF server 32 maintains an up-to-date "map" of the enterprise by periodically polling the network databases. All LSS's are defined in the network database under their server name and connection information (i.e., comms address). It is created from information in the network database 43 and it is updated regularly and passed down by the person server 31 to all workstations. While the preferred embodiment envisions a network wherein the person server 31 and the SMF server 32 are resident on the same platform, it also is possible for the person server and the SMF server to be resident on different platforms.

Figure 6A:
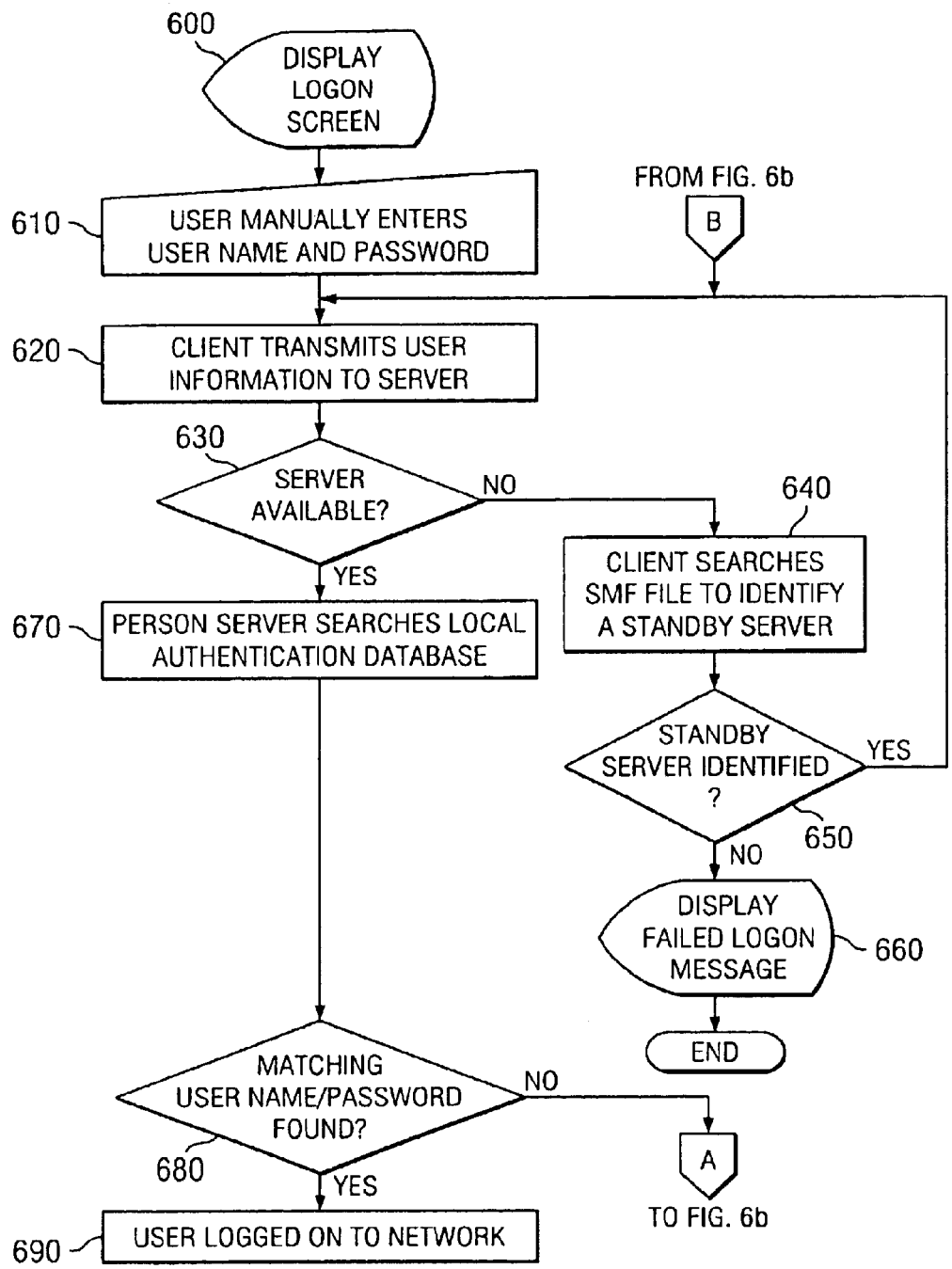
FIGS. 6a and 6b is a flowchart depicting the computerized process of logging a user onto a network in accordance with the preferred embodiment of the present invention.

As seen in FIG. 1, multiple local computer networks may be coupled to the Internet to form a network of geographically separated and smaller computer networks consisting of a wide variety of computers and peripherals. The process of granting the user access to the computer network, as illustrated in FIG. 6, begins when a user at a workstation 11 attempts to log onto the computer network. The client 40 operating on the workstation presents a logon screen to the user (Step 600). In step 610, the user initiates the attempt to gain access by entering a user name and password into the local computer 11. The user name is a predetermined alphanumeric character string which uniquely identifies the user. It is typically assigned to the user by the system administrator who must ensure that the names are unique throughout the enterprise. The client 40 operating on the local computer captures the user's inputs and then in step 620, transmits the user-supplied information and the version number (FIG. 4) of the service mapping file 41 to the workstation's default LSS via communication link 15 or 35 (depending upon the particular workstation). The version number is essentially a time-stamp that indicates when the service mapping file was created. Each time a client 40 attempts to log onto an LSS, the LSS compares the client's service mapping file version number to the version number held by the SMF server 32. If the client's copy is out of date, the LSS returns the latest copy to the client 40. In this way, the client 40 always has the latest connection information for all LSSs on the network. In the event that a client's default LSS is not available, requiring the client 40 to access a standby LSS, the client would retrieve the connection information for a standby server on the network by accessing its copy of the service mapping file 41 stored in each workstation's disk storage (step 640). If a standby server is identified (step 650), the process returns to step 620 where the client 40 transmits the user information to the identified server. If a standby server is not identified, the client 40 displays a failed logon message (step 660) on the workstation's screen and the process terminates.

If it is determined in step 630 that the default server is available, the person server 31 operating on the LSS searches the local authentication database 42 (step 670) and attempts in step 680 to identify a single user name that corresponds to the entered user name and password. If a matching user name and password is found, the user is logged onto the network in step 690. When a user is granted access to the network, the client software evaluates the user role associated with the previously provided user name and password combination to determine the complement of network services that the user will be entitled to access. For example, a user logged onto the network as a manager will be permitted to access those services available on the network that managers are authorized to utilize. If a user is logged onto a network as an employee, he/she will be permitted to access those services normally available to all employees. It is envisioned that the services available to a manager will likely be different than those available to all employees.

If a matching user name and password is not found, the person server 31 then searches the network database 43 (step 690) to determine whether the user name is recognized on the enterprise. In step 710, if no entry is found or if more than one matching entry is found, the person server 31 returns a failed logon message to the client 40 (step 720). Upon receipt of the message, the client 40 in step 730 displays the message on the workstation's display and the process terminates. While this specification describes the invention as if multiple matching entries from the network database 43 would lead to a failed logon response, it should be apparent to those of ordinary skill in the art that a number of other options could be employed without departing from the scope and intent of this invention. For example, the system could provide the user with an opportunity to manually input his/her LSS name or the system could give the user an opportunity to select a user name/LSS combination from a drop-down menu of retrieved user names. Once the user provides the proper LSS name or identifies the proper user name/LSS combination, the person server 31 returns the LSS name back to the client 40 and processing resumes in step 750. Even though this specification describes the invention wherein the person server transmits a local security ID back to a user workstation prior to the user workstation accessing the second local security, it should be apparent to those skilled in the art that the person server can establish a network connection, and therefore log a user onto the network, without returning logon functions to the user workstation.

If a single matching entry is found in step 740, the person server 31 in step 750 transmits the name of the user's primary LSS back to the client 40. Once the client receives the new LSS name, the process returns to step 620 where the client 40 retrieves the logical location of the new LSS from its service mapping file 41 and transmits the user information to the identified server. If no matching entries are found, the person server 31 (step 760) returns a failed logon message to the client 40. Upon receipt of the message, the client 40 (step 770) displays the message on the workstation's display and the process terminates. As a security precaution, the Person server 31 may log all failed attempts to access a local security server in an audit log to be periodically reviewed by the system administrator as a way of identifying security holes. The local security server may also monitor the number of failed attempts and may disable the terminal after a database number of failed attempts have been exceeded.

While this specification includes many details and specificities, these are only included for illustration and are not intended to limit the invention. Many modifications to the examples described above will be readily apparent to those of ordinary skill in the art which do not depart from the scope of the invention as defined by the following claims and their legal equivalents.

INDUSTRIAL APPLICABILITY

The method and apparatus to permit automated server determination for foreign system logon of the present invention may be used for automating authorized user access to a geographically dispersed network from any one of a plurality of user workstations. Moreover, the method and apparatus may be utilized where it is desirable to provide the capability for a user to log onto a network from any workstation on the network through the use of a single password. Furthermore, the method and apparatus to permit automated server determination for foreign system logon of the present invention may be used where it is desirable to provide the capability for a network to automatically identify a user's home server and to log the user onto the system in response to a user's entry of a single user name and password.

I claim:

1. A method for automatic user access authentication, comprising:

receiving identification information at a first local security server from a prospective user at one of a plurality of workstations associated with the first local security server, the first local security server comprising a first local authentication database and a network database;

if the first local authentication database at the first local security server includes authentication information associated with the prospective user and the identification information matches the authentication information associated with the prospective user, authenticating the prospective user; and if the first local authentication database at the first local security server does not include authentication information associated with the prospective user or the identification information does not match the authentication information associated with the prospective user:

communicating with the network database to identify a second local security server including a second local authentication database, the second local authentication database including the authentication information for the prospective user and associated with a second plurality of workstations; and communicating the identification information to allow authentication of the prospective user.

2. The method of claim 1, further comprising maintaining an updated service mapping file for updating the workstations associated with the first local security server.

3. The method of claim 2, the updated service mapping file comprising a version number with a listing of a plurality of local security servers and each local security server's associated logical location.

4. The method of claim 3, further comprising receiving from each workstation a version number of a stored service mapping file stored on the workstation when the prospective user attempts to log onto the first local security server.

5. The method of claim 4 further comprising:

comparing the version number of the stored service mapping file with the version number of the updated service mapping file; and transmitting the updated service mapping file to the workstation in the event that a difference between the two version numbers exceeds a database value.

6. The method of claim 1 further comprising transmitting an identification of the second local security server from the first local security server to the workstation.

7. The method of claim 6, each workstation operable to:
receive an identification of the second local security server from the first local security server; and
dynamically route the identification information to the second local security server to authenticate the prospective user for access to the second local security server.

8. The method of claim 7, wherein each workstation operable to route the identification information to the second local security server comprises each workstation operable to access the updated service mapping file to identify a logical location of the second local security server.

9. The method of claim 1 further comprising communicating the identification information to the second local security server.

10. The method of claim 1, the identification information comprising a user name, a user password and a user role.

11. The method of claim 1, each local authentication database comprising a listing of users authorized to access each local security server with their associated passwords and user roles.

12. The method of claim 11, each workstation operable to:
maintain a listing of the user roles with at least one network service authorized for each user role; and
provide a logged-on user with access to the network services that correspond to the user's role.

13. The method of claim 1, wherein each local authentication database is encrypted.

14. The method of claim 13 further comprising decrypting a user password contained in the first local authentication database prior to authenticating the prospective user for access.

15. The method of claim 1, the network database comprising a network database listing of a plurality of local security servers with each local security server's associated connection information, authorized users, and at least one associated standby local security server.

16. The method of claim 15, each standby local security server comprising a local security server whose local authentication database is substantially identical to its associated local security server's local authentication database.

17. The method of claim 15, the network database listing further comprising an operational status for each local security server.

18. The method of claim 17 further comprising identifying at least one of the associated standby local security servers in the event the local security server is not operational.

19. The method of claim 1 further comprising creating an audit entry for each failed attempt to access the local security server.

20. The method of claim 19, the audit entry comprising an identifier of the workstation, with a date and a time of the failed access attempt.

21. The method of claim 20 further comprising disabling the workstation from which a number of failed access attempts are received, in the event the number of failed access attempts exceeds a database value.

22. The method of claim 1, wherein each local authentication database and the network database are in X.500 format.

23. A system comprising:
a plurality of local security servers, each local security server comprising a local authentication database and a network database and each local security server associated with a plurality of workstations, each of the local security servers operable to:
receive identification information from a prospective user at one of the associated workstations;
if the local authentication database includes authentication information associated with the prospective user and the identification information matches the authentication information associated with the prospective user, authenticate the prospective user; and
if the local authentication database does not include authentication information associated with the prospective user or the identification information does not match the authentication information associated with the prospective user:
communicate with the network database to identify one of the other local security servers whose local authentication database includes the authentication information for the prospective user; and
communicating the identification information to allow authentication of the prospective user.

24. The system of claim 23, each of the local security servers further operable to maintain an updated service mapping file to update the associated workstations.

25. The system of claim 24, the updated service mapping file comprising a version number with a listing of a plurality of local security servers and each local security server's associated logical location.

26. The system of claim 25, each workstation operable to communicate a version number of a stored service mapping file stored on the workstation to the associated local security server whenever the prospective user attempts to log onto the associated local security server.

27. The system of claim 26, each of the local security servers further operable to:
compare the version number of the stored service mapping file with the version number of the updated service mapping file; and
transmit the updated service mapping file to the workstation in the event that a difference between the two version numbers exceeds a database value.

28. The system of claim 23, each of the local security servers further operable to transmit an identification of the identified local security server to the associated workstation.

29. The system of claim 28, each workstation operable to:
receive an identification of the identified local security server from the associated local security server; and
dynamically route the identification information to the identified local security server to authenticate the prospective user for access to the identified local security server.

30. The system of claim 29, wherein each workstation operable to route the identification information to the identified local security server comprises each workstation operable to access the updated service mapping file to identify a logical location of the identified local security server.

31. The system of claim 23, each of the local security servers further operable to communicate the identification information to the identified local security server.

32. The system of claim 23, the identification information comprising a user name, a user password and a user role.

33. The system of claim 23, each local authentication database comprising a listing of users authorized to access each local security server with their associated passwords and user roles.

34. The system of claim 33, each workstation operable to:
maintain a listing of the user roles with at least one network service authorized for each user role; and
provide a logged-on user with access to the network services that correspond to the user's role.

35. The system of claim 23, wherein each local authentication database is encrypted.

36. The system of claim 35, each of the local security servers further operable to decrypt a user password contained in the local authentication database prior to authenticating the prospective user for access.

37. The system of claim 23, the network database comprising a network database listing of the plurality of local security servers with each local security server's associated connection information, authorized users, and at least one associated standby local security server.

38. The system of claim 37, each standby local security server comprising a local security server whose local authentication database is substantially identical to its associated local security server's local authentication database.

39. The system of claim 37, the network database listing further comprising an operational status for each local security server.

40. The system of claim 39, each of the local security servers further operable to identify at least one of the associated standby local security servers in the event the local security server is not operational.

41. The system of claim 23, each of the local security servers further operable to create an audit entry for each failed attempt to access the local security server.

42. The system of claim 41, the audit entry comprising an identifier of the workstation, with a date and a time of the failed access attempt.

43. The system of claim 42, each of the local security servers further operable to disable the workstation from which a number of failed access attempts are received in the event the number of failed access attempts exceeds a database value.

44. The system of claim 23, wherein each local authentication database and the network database are in X.500 format.

45. Software embodied on at least one computer readable medium and operable when executed to:
receive identification information at a first local security server from a prospective user at one of a plurality of workstations associated with the first local security server, the first local security server comprising a first local authentication database and a network database;
if the first local authentication database at the first local security server includes authentication information associated with the prospective user and the identification information matching the authentication information associated with the prospective user, authenticate the prospective user; and
if the first local authentication database at the first local security server does not include authentication information associated with the prospective user or the identification information does not match the authentication information associated with the prospective user:
communicate with the network database to identify a second local security server including a second local authentication database, the second local authentication database including the authentication information for the prospective user and associated with a second plurality of workstations; and
communicate the identification information to allow authentication of the prospective user.

46. The software of claim 45 further operable to maintain an updated service mapping file for updating the workstations associated with the first local security server.

47. The software of claim 46, the updated service mapping file comprising a version number with a listing of a plurality of local security servers and each local security server's associated logical location.

48. The software of claim 47 further operable to receive from each workstation a version number of a stored service mapping file stored on the workstation when the prospective user attempts to log onto the first local security server.

49. The software of claim 48 further operable to:
compare the version number of the stored service mapping file with the version number of the updated service mapping file; and
transmit the updated service mapping file to the workstation in the event that a difference between the two version numbers exceeds a database value.

50. The software of claim 45 further operable to transmit an identification of the second local security server from the first local security server to the workstation.

51. The software of claim 50, each workstation operable to:
receive an identification of the second local security server from the first local security server; and
dynamically route the identification information to the second local security server to authenticate the prospective user for access to the second local security server.

52. The software of claim 51, wherein each workstation operable to route the identification information to the second local security server comprises each workstation operable to access the updated service mapping file to identify a logical location of the second local security server.

53. The software of claim 45 further operable to communicate the identification information to the second local security server.

54. The software of claim 45, the identification information comprising a user name, a user password and a user role.

55. The software of claim 45, each local authentication database comprising a listing of users authorized to access each local security server with their associated passwords and user roles.

56. The software of claim 55, each workstation operable to:
maintain a listing of the user roles with at least one network service authorized for each user role; and
provide a logged-on user with access to the network services that correspond to the user's role.

57. The software of claim 45, wherein each local authentication database is encrypted.

58. The software of claim 57 further operable to decrypt a user password contained in the first local authentication database prior to authenticating the prospective user for access.

59. The software of claim 45, the network database comprising a network database listing of a plurality of local security servers with each local security server's associated connection information, authorized users, and at least one associated standby local security server.

60. The software of claim 59, each standby local security server comprising a local security server whose local authentication database is substantially identical to its associated local security server's local authentication database.

61. The software of claim 59, the network database listing further comprising an operational status for each local security server.

62. The software of claim 61 further operable to identify at least one of the associated standby local security servers in the event the local security server is not operational.

63. The software of claim 45 further operable to create an audit entry for each failed attempt to access the local security server.

64. The software of claim 63, the audit entry comprising an identifier of the workstation, with a date and a time of the failed access attempt.

65. The software of claim 64 further operable to disable the workstation from which a number of failed access attempts are received, in the event the number of failed access attempts exceeds a database value.

66. The software of claim 45, wherein each local authentication database and the network database are in X.500 format.

* * * * *

UNITED STATES PATENT AND TRADEMARK OFFICE
CERTIFICATE OF CORRECTION

Figure 6B:
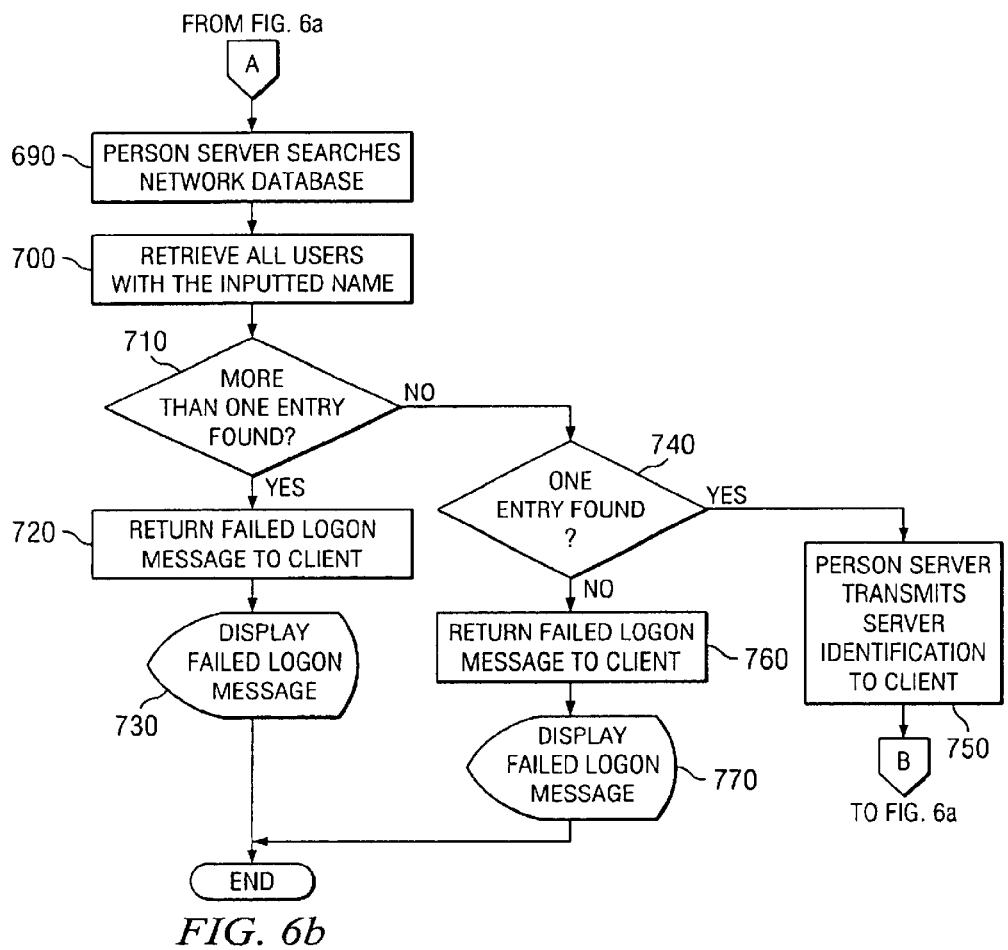

PATENT NO. : 6,826,692 B1
DATED : November 30, 2004
INVENTOR(S) : Clive John White It is certified that error appears in the above-identified patent and that said Letters Patent is hereby corrected as shown below:

Drawings,
Sheet 1, Fig. 1, replace "40" with -- 50 --
Sheet 4, Fig. 6b, replace "690" with -- 695 --

Column 7,
Line 33, replace "40" with -- 50 --

Column 8,
Line 57, after "available" insert -- (step 630) --

Column 9,
Line 19, after "found" insert -- (step 680) --
Line 21, replace "690" with -- 695 --

Signed and Sealed this

Twenty-first Day of June, 2005

JON W. DUDAS
*Director of the United States Patent and Trademark Office*